(12) United States Patent
Yonetsu

(10) Patent No.: US 11,052,623 B2
(45) Date of Patent: Jul. 6, 2021

(54) TIRE CURE MOLD AND METHOD FOR MANUFACTURING TIRE

(71) Applicant: Toyo Tire Corporation, Itami (JP)

(72) Inventor: Isao Yonetsu, Itami (JP)

(73) Assignee: TOYO TIRE CORPORATION, Itami (JP)

( * ) Notice: Subject to any disclaimer, the term of this patent is extended or adjusted under 35 U.S.C. 154(b) by 0 days.

(21) Appl. No.: 16/733,437

(22) Filed: Jan. 3, 2020

(65) Prior Publication Data

US 2020/0238646 A1    Jul. 30, 2020

(30) Foreign Application Priority Data

Jan. 30, 2019    (JP) .............................. JP2019-014251

(51) Int. Cl.
*B29D 30/06*    (2006.01)
*B29C 33/42*    (2006.01)
*B29C 33/30*    (2006.01)

(52) U.S. Cl.
CPC ........ *B29D 30/0606* (2013.01); *B29C 33/306* (2013.01); *B29C 33/424* (2013.01); *B29D 2030/0612* (2013.01); *B29D 2030/0616* (2013.01)

(58) Field of Classification Search
CPC ........ B29D 30/0606; B29D 2030/0612; B29D 2030/0616; B29C 30/306; B29C 30/424; B29C 33/306; B29C 33/424
See application file for complete search history.

(56) References Cited

U.S. PATENT DOCUMENTS

| | | | | |
|---|---|---|---|---|
| 1,567,402 A | * | 12/1925 | Venn ..................... | B29C 33/424 425/35 |
| 1,969,083 A | * | 8/1934 | Lawson ................. | B29D 23/24 425/45 |
| 2,296,016 A | * | 9/1942 | Bostwick ........... | B29D 30/0606 425/28.1 |
| 4,547,139 A | * | 10/1985 | Hershberger ...... | B29D 30/0606 425/192 R |
| 4,625,101 A | * | 11/1986 | Hinks .............. | G06K 19/06028 152/523 |

(Continued)

FOREIGN PATENT DOCUMENTS

| | | |
|---|---|---|
| JP | 2007-38528 A | 2/2007 |
| JP | 2014-133402 A | 7/2014 |

(Continued)

*Primary Examiner* — James P Mackey
(74) *Attorney, Agent, or Firm* — Westerman, Hattori, Daniels & Adrian, LLP

(57) ABSTRACT

A tire cure mold has a tire molding face, a mounting groove provided to the tire molding face and a stencil plate mounted into the mounting groove. The stencil plate has a front face that faces a cavity, a back face that faces a bottom face of the mounting groove, and a through hole extending from the front face to the back face. A recessed portion for forming a protruding identification mark on the outer surface of the tire is provided to the front face. A first protruding portion corresponding to the recessed portion is provided to the back face. A second protruding portion that protrudes toward the bottom face of the mounting groove is provided to an outer edge portion of the stencil plate at least at a periphery of the through hole.

6 Claims, 5 Drawing Sheets

(56) References Cited

U.S. PATENT DOCUMENTS

| | | | |
|---|---|---|---|
| 7,883,326 B1 * | 2/2011 | Parmelee | B29D 30/0662 |
| | | | 425/28.1 |
| 9,649,890 B2 * | 5/2017 | Sakamoto | B60C 13/001 |
| 10,029,433 B1 | 7/2018 | Ohara | |
| 2014/0261947 A1 | 9/2014 | Sakamoto et al. | |

FOREIGN PATENT DOCUMENTS

| | | |
|---|---|---|
| JP | 2014-172360 A | 9/2014 |
| JP | 2018-149744 A | 9/2018 |

* cited by examiner

[Fig. 1]
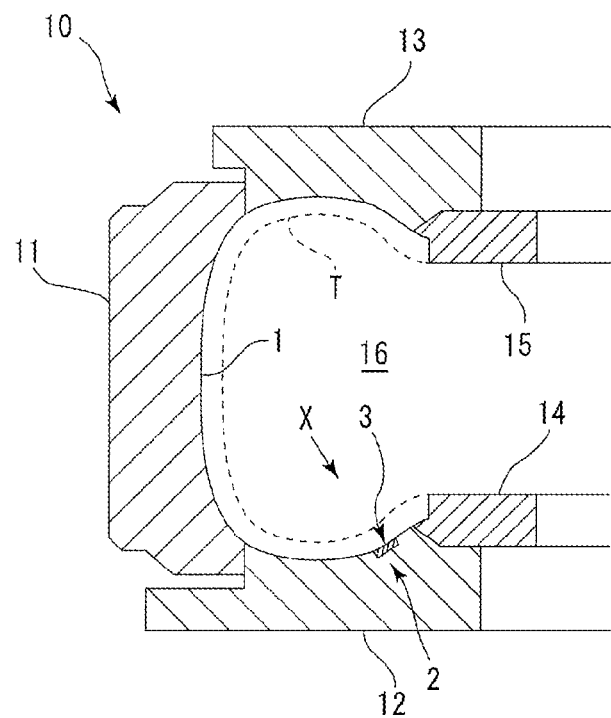
[Fig. 2]
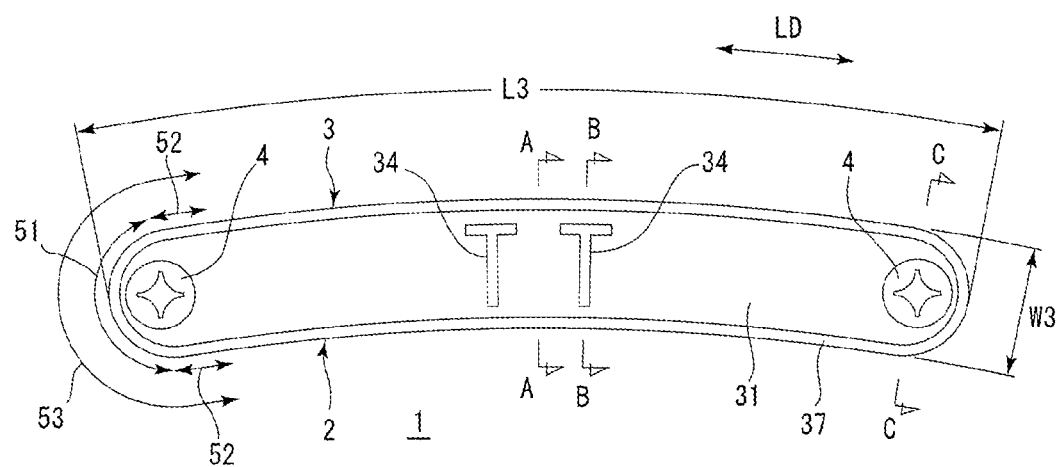

[Fig. 3A]
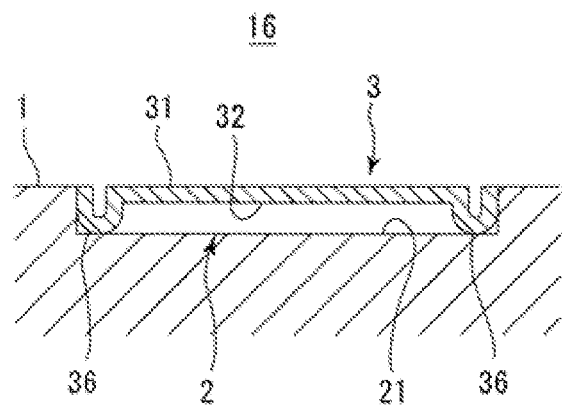
[Fig. 3B]
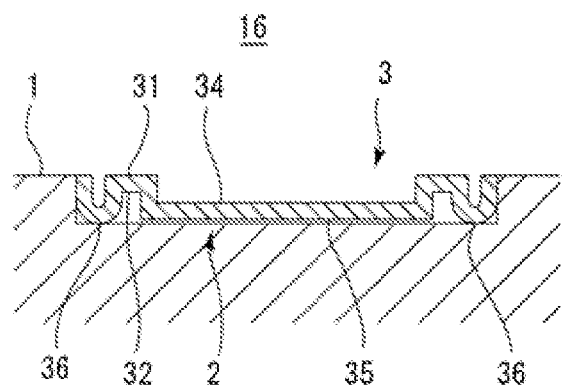
[Fig. 3C]
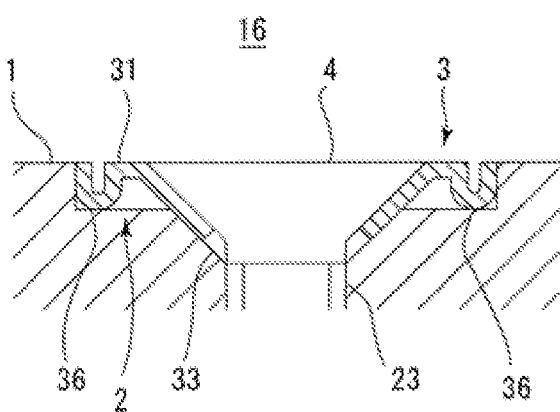

[Fig. 4]
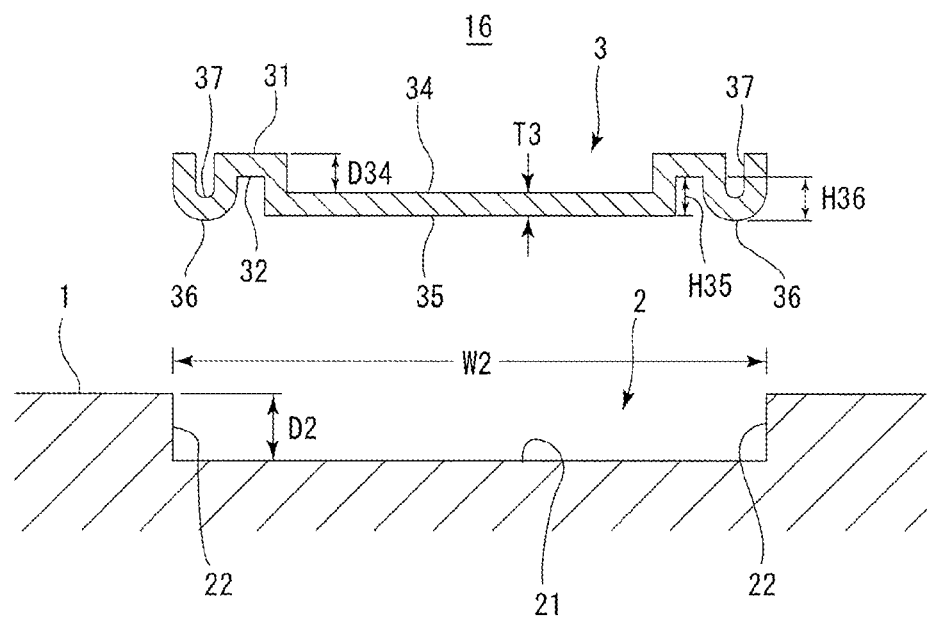
[Fig. 5]
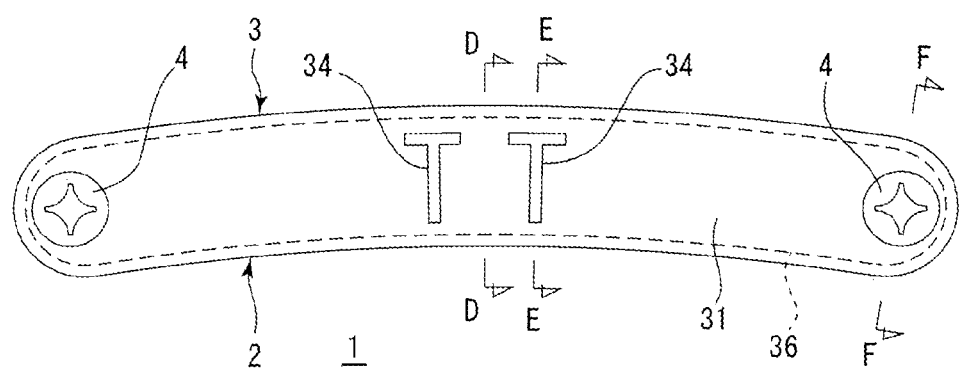

[Fig. 6A]
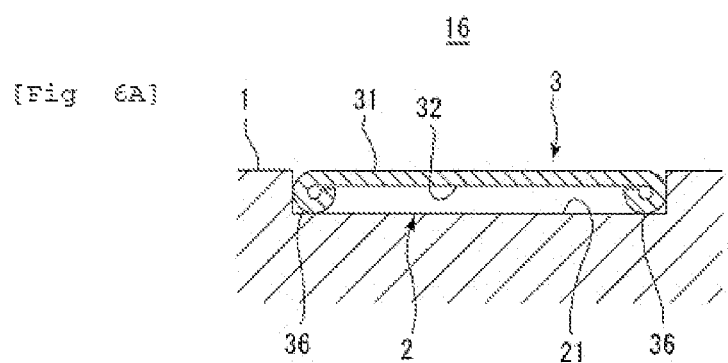
[Fig. 6B]
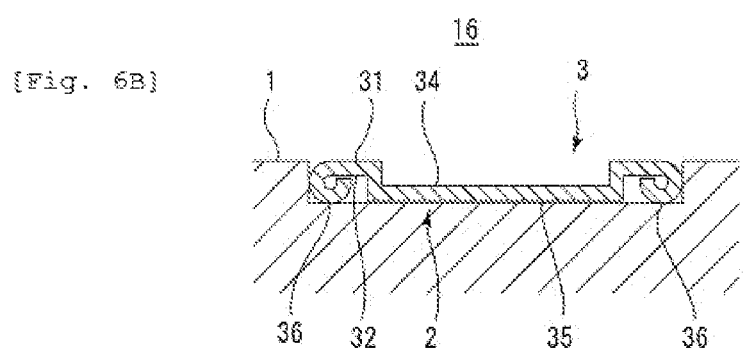
[Fig. 6C]
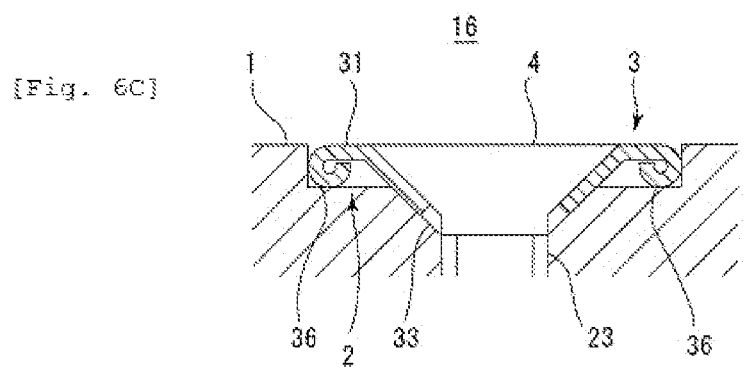

[Fig. 7]
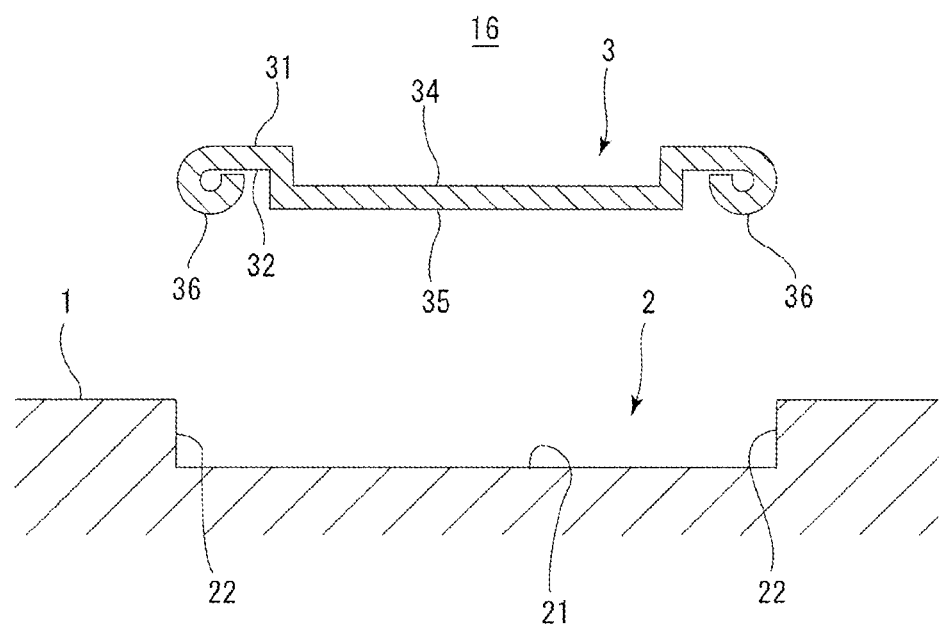
[Fig. 8] Related Art
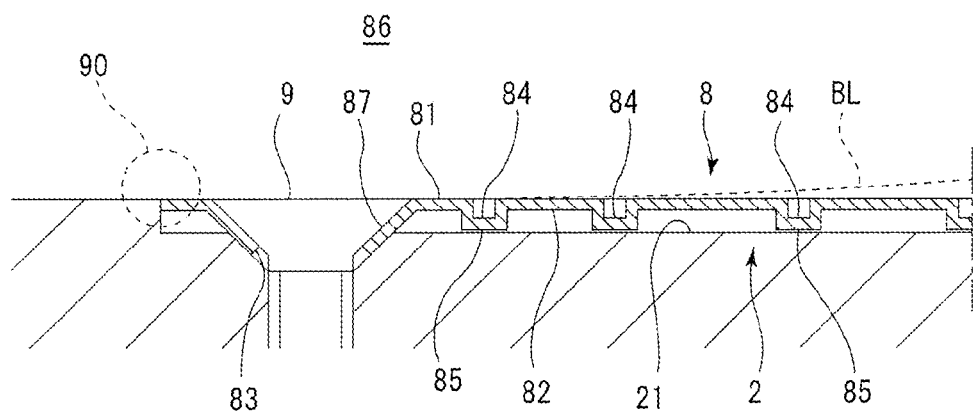

TIRE CURE MOLD AND METHOD FOR MANUFACTURING TIRE

BACKGROUND OF THE INVENTION

Field of the Invention

The present disclosure relates to a tire cure mold including a stencil plate mounted to a tire molding face and a method for manufacturing a tire by use of the tire cure mold.

Description of the Related Art

Identification marks formed by letters or symbols indicating a tire size, a load index, a name of a manufacturer, and week and year of manufacture are formed on an outer surface of a pneumatic tire. As described in Patent Documents 1 to 4, a stencil plate (also referred to as "serial plate") formed by a metal thin plate is used to form the identification marks in some cases. In cure, an uncured tire is pressed against the stencil plate mounted to a tire molding face of a tire cure mold and the identification marks are formed by transfer.

As shown in FIG. 8, the stencil plate 8 has a front face 81 facing a cavity 86 and a back face 82 facing a bottom face 21 of a mounting groove 2. Recessed portions 84 for forming the identification marks are formed in the front face 81. In this way, the protruding identification marks are formed in an outer surface of the tire. The stencil plate 8 is produced by embossing the metal thin plate. As a result, protruding portions 85 corresponding to the recessed portions 84 are formed on the back face 82. In this manner, the stencil plate 8 for forming the protruding identification marks on the outer surface of the tire is provided with the protruding portions 85 protruding toward the bottom face 21 of the mounting groove 2.

At end portions in a longitudinal direction LD of the stencil plate 8, through holes 83 into which bolts 9 are mounted are formed. If a worker fastens the bolts 9 tightly, the stencil plate 8 may warp as shown by a broken line BL in some cases. Studies show that a central part in the longitudinal direction LD of the stencil plate 8 lifts because the protruding portions 85 push the bottom face 21 of the mounting groove 2 near the bolts 9 or drawn portions 87 of the stencil plate 8 are pushed against the bottom face 21. If the stencil plate 8 warps, a clearance is formed at the central part and therefore rubber may enter the mounting groove 2 in the cure, which may ruin an appearance of the tire.

PRIOR ART DOCUMENTS

Patent Documents

Patent Document 1: JP-A-2018-149744
Patent Document 2: JP-A-2014-133402
Patent Document 3: JP-A-2014-172360
Patent Document 4: JP-A-2007-38528

SUMMARY OF THE INVENTION

It is an object of the present disclosure to provide a tire cure mold in which warping of a stencil plate can be suppressed and a method for manufacturing a tire by use of the tire cure mold.

The present disclosure provides a tire cure mold comprising a tire molding face that comes in contact with an outer surface of a tire set in a cavity, a mounting groove provided to the tire molding face, and a stencil plate mounted into the mounting groove, wherein the stencil plate has a front face that faces the cavity, a back face that faces a bottom face of the mounting groove, and a through hole extending from the front face to the back face, a recessed portion for forming a protruding identification mark on the outer surface of the tire is provided to the front face, a first protruding portion corresponding to the recessed portion is provided to the back face, and a second protruding portion that protrudes toward the bottom face of the mounting groove is provided to an outer edge portion of the stencil plate at least at a periphery of the through hole. With this structure, the second protruding portion comes in contact with the bottom face of the mounting groove when a worker fastens a fixing member tightly, which suppresses the warping of the stencil plate.

It is preferable that the second protruding portion is provided throughout a circumference along the outer edge portion of the stencil plate. With this structure, it is possible to further effectively suppress the warping of the stencil plate.

From a viewpoint of appropriately suppressing the warping of the stencil plate, a protruding height of the second protruding portion is preferably equal to or greater than a protruding height of the first protruding portion.

The second protruding portion may be provided by bending a side end portion of the stencil plate in a U shape. In this case, it is possible to provide the second protruding portion by embossing the stencil plate without using a separate member.

The second protruding portion may be provided by rolling a side end portion of the stencil plate toward a side of the back face. In this case, it is possible to provide the second protruding portion by bending the stencil plate without using a separate member.

The present disclosure provides a method for manufacturing a tire, comprising a step of curing the tire by use of the tire cure mold mentioned above. By use of the above-described tire cure mold, the warping of the stencil plate is suppressed. As a result, it is possible to prevent formation of a clearance which allows entry of rubber into the mounting groove to thereby improve an appearance of the tire.

BRIEF DESCRIPTION OF THE DRAWINGS

FIG. 1 is a vertical sectional view schematically showing an example of a tire cure mold according to the present disclosure;

FIG. 2 is a plan view (a view from a direction of arrow X in FIG. 1) showing a part of an inner face of a side mold portion;

FIG. 3A is a sectional view from a direction of arrow A-A in FIG. 2;

FIG. 3B is a sectional view from a direction of arrow B-B in FIG. 2;

FIG. 3C is a sectional view from a direction of arrow C-C in FIG. 2;

FIG. 4 is a view of a stencil plate in FIG. 3B separate from a mounting groove;

FIG. 5 is a plan view showing a part of an inner face of a side mold portion in another embodiment;

FIG. 6A is a sectional view from a direction of arrow D-D in FIG. 5;

FIG. 6B is a sectional view from a direction of arrow E-E in FIG. 5;

FIG. 6C is a sectional view from a direction of arrow F-F in FIG. 5;

FIG. 7 is a view of a stencil plate in FIG. 6B separate from a mounting groove;

FIG. 8 is a half sectional view of an example of a prior-art stencil plate.

DETAILED DESCRIPTION OF THE PREFERRED EMBODIMENTS

An embodiment of the present disclosure will be explained with reference to the drawings.

FIG. 1 shows a section of a tire cure mold 10 (hereinafter merely referred to as "mold 10" in some cases) along a tire meridian. The mold 10 is in a closed state. A tire T is set with a tire width direction oriented in a vertical direction. In FIG. 1, a left side corresponds to an outer side in a tire diametrical direction and a right side corresponds to an inner side in the tire diametrical direction. FIG. 2 is a plan view from a direction of arrow X in FIG. 1 and shows a part of an inner face of a side mold portion 12 positioned on a lower side. In FIG. 2, a left-right direction corresponds to a tire circumferential direction, an upward direction corresponds to the outward direction in the tire diametrical direction, and a downward direction corresponds to the inward direction in the tire diametrical direction. FIGS. 3A to 3C are sectional views from directions of arrows A-A, B-B, and C-C in FIG. 2, respectively. FIG. 4 illustrates a stencil plate 3 in FIG. 3B separate from a mounting groove 2.

The mold 10 includes a tread mold portion 11 for molding a tread portion of the tire T, paired side mold portions 12, 13 for molding sidewall portions of the tire T, and paired bead rings 14, 15 with which bead portions of the tire T are fitted. The mold 10 has a tire molding face 1 that comes in contact with an outer surface of the tire T set in a cavity 16. The tire molding face 1 includes an inner face of the tread mold portion 11, inner faces of the side mold portions 12, 13, and inner faces of the bead rings 14, 15. Recessed and protruding portions (not shown) for forming a tread pattern on the tread face of the tire T are provided to the inner face of the tread mold portion 11.

An example of a material of the inner face of the tread mold portion 11 is an aluminum material. The aluminum material is a concept including an aluminum alloy in addition to a pure aluminum raw material, for example, there can be listed up Al—Cu, Al—Mg, Al—Mg—Si, Al—Zn—Mg, Al—Mn and Al—Si. An example of a material of the inner faces of the side mold portions 12, 13 and a material of the inner faces of the bead rings 14, 15 is a steel such as a rolled steel for a general structure (e.g., SS400).

The mold 10 has the tire molding face 1 that comes in contact with the outer surface of the tire T set in the cavity 16, the mounting groove 2 formed in the tire molding face 1, and the stencil plate 3 mounted into the mounting groove 2. The mounting groove 2 is formed by locally recessing a part of the tire molding face 1. In the embodiment, the mounting groove 2 is formed in the inner face of the side mold portion 12 which is the tire molding face 1. The mounting groove 2 has a bottom face 21 and wall faces 22 rising from the bottom face 21. Internal threaded holes 23 into which bolts 4 as fixing members are mounted are formed in the bottom face 21.

The stencil plate 3 is formed by a plate member made of metal such as stainless steel and aluminum. Although a thickness T3 of the stencil plate 3 is 1.0 mm or smaller, for example, and typically 0.8 mm or smaller, the thickness T3 may be 0.7 mm or smaller. The thickness T3 is preferably 0.2 mm or more and best preferably 0.5 mm or more from a viewpoint of imparting an appropriate degree of strength to the stencil plate 3. The stencil plate 3 has a laterally long shape having a greater length L3 in the tire circumferential direction than a width W3 in the tire diametrical direction. The length L3 and the width W3 are set to dimensions greater than a length in the tire circumferential direction and a width W2 in the tire diametrical direction of the mounting groove 2 by about 0.1 to 0.3 mm, for example, respectively. Although the stencil plate 3 is curved in an arc shape along the tire circumferential direction, the shape of the stencil plate 3 is not limited to this shape and may be a shape extending straight in a longitudinal direction LD.

The stencil plate 3 has a front face 31 facing the cavity 16, a back face 32 facing the bottom face 21 of the mounting groove 2, and through holes 33 extending from the front face 31 to the back face 32. Recessed portions 34 for forming protruding identification marks on the outer surface of the tire T are formed in the front face 31. In cure, the outer surface of an uncured tire is pressed against the front face 31 of the stencil plate 3 and the identification marks are formed in protruding shapes by transfer. In an example shown in the embodiment, the identification marks are formed by a string of letters, "TT". The identification marks are not limited to letters and may be symbols, patterns, and the like.

The recessed portions 34 are formed to be dented by embossing from the side of the front face 31. Depths D34 of the recessed portions 34 are set to 0.3 to 1.2 mm, for example. The depths D34 are dimensions from the front face 31. On the back face 32, protruding portions 35 (corresponding to first protruding portions) corresponding to the recessed portions 34 are provided. The protruding portions 35 are formed as a result of forming the recessed portions 34 by denting. Therefore, the protruding portions 35 are the recessed portions 34 seen from the side of the back face 32 of the stencil plate 3. Protruding heights H35 of the protruding portions 35 are substantially equal to the depths D34. The protruding heights H35 are dimensions from the back face 32. The protruding heights H35 are smaller than a depth D2 of the mounting groove 2.

In the embodiment, at opposite end portions in the longitudinal direction LD of the stencil plate 3, the through holes 33 into which bolts 4 are mounted are provided. The stencil plate 3 is detachably mounted to the tire molding face 1 by use of the bolts 4. To change the identification marks as in the case of renewing week and year of manufacture, the stencil plate 3 is detached from the tire molding face 1 and another stencil plate having recessed portions for forming different identification marks is mounted. Although top faces of the bolts 4 are disposed to be flush with the tire molding face 1, positions of the top faces are not limited to these positions. For example, the top faces may be close to the bottom face 21 of the mounting groove 2.

As already described, the stencil plate 3 is mounted to the tire molding face 1 by use of the bolts 4. A protruding portion 36 (corresponding to a second protruding portion) protruding toward the bottom face 21 of the mounting groove 2 is provided to an outer edge portion of the stencil plate 3 at least at peripheries of the through holes 33 so that the stencil plate 3 does not warp even when a worker fastens the bolts 4 excessively tightly. If the bolts 4 are fastened tightly, the protruding portion 36 comes in contact with the bottom face 21, which suppresses the warping of the stencil plate 3. As a result, it is possible to prevent formation of a clearance which allows entry of rubber to thereby improve an appearance of the tire after the cure.

In the embodiment, the protruding portion 36 is provided throughout a circumference along the outer edge portion of the stencil plate 3. In other words, the protruding portion 36 is formed in an annular shape in such a manner as to edge a periphery of the back face 32. With this structure, the protruding portion 36 can come in contact with the bottom face 21 throughout the circumference of the stencil plate 3, which further effectively suppresses the warping. However, the protruding portion 36 only has to be provided at least at the peripheries of the through holes 33. Therefore, the protruding portion 36 may be provided only in a C-shaped area 51, paired arc-shaped areas 52, 52 facing each other, or a U-shaped area 53 which is a combination of the C-shaped area 51 and the arc-shaped areas 52, 52 shown in FIG. 2, for example.

If the protruding portion 36 is provided along the outer edge portion of the stencil plate 3, deformation of the outer edge portion of the stencil plate 3 is suppressed in the cure, which prevents formation of unintended rubber burrs. The protruding portion 36 provided throughout the circumference is highly effective at the improvement. On the other hand, if the protruding portion is not provided along the outer edge portion of the stencil plate 3 (see a broken-line circle 90 in FIG. 8, for example), the outer edge portion of the stencil plate 3 may be pushed and deformed by the rubber in the cure and the unintended rubber burrs may be formed.

From a viewpoint of appropriately suppressing the warping of the stencil plate 3, a protruding height H36 of the protruding portion 36 is preferably equal to or greater than the protruding heights H35 of the protruding portions 35. If the protruding height H36 is greater than the protruding heights H35, the protruding portion 36 is likely to come in contact with the bottom face 21 earlier than the protruding portions 35, which effectively suppresses the warping. The protruding height H36 is smaller than the depth D2 of the mounting groove 2. The sum (H36+T3) of the protruding height H36 and the thickness T3 is preferably equal to or smaller than the depth D2. The protruding height H36 is a dimension from the back face 32.

The protruding portion 36 is formed by bending a side end portion of the stencil plate 3 in a U shape. An end face of the side end portion faces the cavity 16. The protruding portion 36 can be formed by embossing the stencil plate 3 and therefore a separate member is not required. A recessed portion 37 corresponding to the protruding portion 36 on the back face 32 is formed in the front face 31. The recessed portion 37 is formed as a recessed groove having a semi-circular sectional shape. On the outer surface of the tire T, a bulge made of the rubber entering the recessed portion 37 is formed to surround the identification marks. Because the bulge is formed to have the semicircular sectional shape, the bulge looks better than the rubber burrs formed unintendedly and does not ruin the appearance of the tire T after the cure.

FIGS. 5 to 7 show a modification in which a protruding portion 36 corresponding to the second protruding portion has a different shape. FIG. 5 is a plan view showing a part of an inner face of a side mold portion 12 and corresponds to FIG. 2 (i.e., the plan view from the direction of arrow X in FIG. 1) in the above embodiment. FIGS. 6A to 6C are sectional views from directions of arrows D-D, E-E, and F-F in FIG. 5, respectively. FIG. 7 illustrates a stencil plate 3 in FIG. 6B separate from a mounting groove 2. Other than the structures described below, the modification has similar structures and effects to those in the above described embodiment.

In the example shown in FIGS. 5 to 7, a protruding portion 36 is formed by rolling a side end portion of the stencil plate 3 toward the side of a back face 32. The protruding portion 36 can be formed by bending the stencil plate 3 and therefore a separate member is not required. The protruding portion 36 is formed in a substantially annular shape and an end face of the side end portion faces a cavity 16. Therefore, the end face of the stencil plate 3 is not exposed and there is no possibility that the end face hurts fingers of a worker. The protruding portion 36 formed by rolling the side end portion toward the side of the back face 32 may be formed in a C shape or a helical shape.

A method for manufacturing the tire by using the tire cure mold 10 includes a step of curing the tire T by use of the mold 10, and more concretely, a step of setting the uncured tire in the cavity 16 and performing the cure by heating and pressurizing the uncured tire. The tire is expanded and deformed by inflation of a bladder and the outer surface of the tire comes to push the tire molding face 1. On the outer surface of the cured tire, the identification marks are formed by the stencil plate 3.

Although the mounting groove 2 into which the stencil plate 3 is mounted is formed in the inner face of the side mold portion 12 positioned on the lower side in the example shown in the above described embodiment, a mounting groove may be formed in the inner face of the side mold portion 13 positioned on the upper side in place of or in addition to the mounting groove 2. The mounting groove 2 into which the stencil plate 3 is mounted may be formed in the inner face of the tread mold portion 11 or in the inner faces of the bead rings 14, 15.

Although a mold structure including the tread mold portion 11 and the paired side mold portions 12, 13 is shown as an example in the above described embodiment, the mold does not necessarily have to have this structure and a mold structure split into upper and lower two portions at a center of a tread mold portion may be employed, for example.

The above-described tire cure mold is equivalent to a normal tire cure mold except that the stencil plate mounted into the mounting groove in the tire molding face is formed as described above. Therefore, any of prior-art known shapes, materials, mechanisms, and the like can be used.

The present invention is not limited to the embodiment mentioned above, but can be improved and modified variously within the scope of the present invention.

What is claimed is:
1. A tire cure mold comprising:
  a tire molding face that comes in contact with an outer surface of a tire set in a cavity;
  a mounting groove provided to the tire molding face; and
  a stencil plate mounted into the mounting groove,
  wherein
  the stencil plate has a front face that faces the cavity, a back face that faces a bottom face of the mounting groove, a side end portion, and a through hole extending from the front face to the back face,
  a recessed portion disposed on the front face, the recessed portion forming a protruding mark on the outer surface of the tire,
  a first protruding portion corresponding to the recessed portion is disposed on the back face, and
  a second protruding portion is disposed at an outer edge portion of the stencil plate at least at a periphery of the through hole, the second protruding portion being bent to have the side end portion of the stencil plate be in a U shape and an end face of the side end portion of the stencil plate facing the cavity.
2. The tire cure mold according to claim 1, wherein the second protruding portion is provided throughout a circumference along the outer edge portion of the stencil plate.

3. The tire cure mold according to claim 1, wherein a protruding height of the second protruding portion is equal to a protruding height of the first protruding portion.

4. The tire cure mold according to claim 1, wherein a protruding height of the second protruding portion is greater than a protruding height of the first protruding portion.

5. A method for manufacturing a tire, comprising a step of curing the tire by use of the tire cure mold according to claim 1.

6. A tire cure mold comprising:
   a tire molding face that comes in contact with an outer surface of a tire set in a cavity;
   a mounting groove provided to the tire molding face; and
   a stencil plate mounted into the mounting groove, wherein
   the stencil plate has a front face that faces the cavity, a back face that faces a bottom face of the mounting groove, a side end portion, and a through hole extending from the front face to the back face,
   a recessed portion disposed on the front face, the recessed portion forming a protruding mark on the outer surface of the tire,
   a first protruding portion corresponding to the recessed portion is disposed on the back face, and
   a second protruding portion is disposed at an outer edge portion of the stencil plate at least at a periphery of the through hole, the second protruding portion having a substantially annular shape with the side end portion being rolled toward a side of the back face and an end face of the side end portion of the stencil plate facing the cavity.

* * * * *